US005809433A

United States Patent [19]

Thompson et al.

[11] Patent Number: 5,809,433

[45] Date of Patent: Sep. 15, 1998

[54] MULTI-COMPONENT ANTENNA AND METHOD THEREFOR

[75] Inventors: David Charles Thompson, Grayslake; Louis Jay Vannatta, Crystal Lake, both of Ill.

[73] Assignee: Motorola, Inc., Schaumburg, Ill.

[21] Appl. No.: 843,828

[22] Filed: Apr. 21, 1997

Related U.S. Application Data

[63] Continuation of Ser. No. 389,513, Feb. 16, 1995, abandoned, which is a continuation-in-part of Ser. No. 306,784, Sep. 15, 1994, abandoned.

[51] Int. Cl.[6] .......... H04B 1/38

[52] U.S. Cl. .......... 455/575; 455/90; 455/129; 455/351; 343/702; 343/793; 379/428

[58] Field of Search .......... 455/90, 550, 566, 455/569, 575, 128, 129, 95, 97, 344, 347, 348, 351, 121; 343/702, 725, 793, 872; 379/433, 428

[56] References Cited

U.S. PATENT DOCUMENTS

| | | | |
|---|---|---|---|
| 2,315,315 | 3/1943 | Cairnes . | |
| 4,121,218 | 10/1978 | Irwin et al. . | |
| 4,313,119 | 1/1982 | Garay et al. . | |
| 4,471,493 | 9/1984 | Schober . | |
| 4,630,061 | 12/1986 | Hately . | |
| 4,644,366 | 2/1987 | Scholz . | |
| 4,725,845 | 2/1988 | Phillips . | |
| 4,868,576 | 9/1989 | Johnson, Jr. . | |
| 4,992,799 | 2/1991 | Garay | 343/702 |
| 5,014,346 | 5/1991 | Phillips et al. . | |
| 5,057,849 | 10/1991 | Dorrie et al. . | |
| 5,170,173 | 12/1992 | Krenz et al. . | |
| 5,337,061 | 8/1994 | Pye et al. . | |
| 5,451,965 | 9/1995 | Matsumoto | 343/702 |
| 5,542,106 | 7/1996 | Krenz et al. | 455/129 |
| 5,561,436 | 10/1996 | Phillips | 455/575 |
| 5,572,223 | 11/1996 | Phillips et al. | 343/702 |
| 5,649,306 | 7/1997 | Vannatta et al. | 455/90 |

FOREIGN PATENT DOCUMENTS

| | | |
|---|---|---|
| 415703A1 | 3/1991 | European Pat. Off. . |
| 93/18592 | 9/1993 | WIPO . |

OTHER PUBLICATIONS

Sharder, Robert L., *Electronic Communication*, 6th ed., pp. 320–321.

*Primary Examiner*—Doris H. To
*Attorney, Agent, or Firm*—Randall S. Vaas

[57] ABSTRACT

A radio communication device a first housing portion (101) and second housing portion (103). The second housing portion is movably supported on the first housing portion to move between an extended position and a collapsed position. The second housing portion projects outwardly from the first housing portion in the open position. An antenna (107) is positioned in the second housing portion, the antenna includes a first component (640, 749, 859, 969) having a first tuning characteristic and a second component (647, 748, 858, 968) having a second tuning characteristic. One of the antenna components is tuned for a preferred characteristic when the radio telephone is collapsed and the other of the antenna components is tuned to the preferred characteristic when the antenna is extended.

16 Claims, 7 Drawing Sheets

FIG. 4
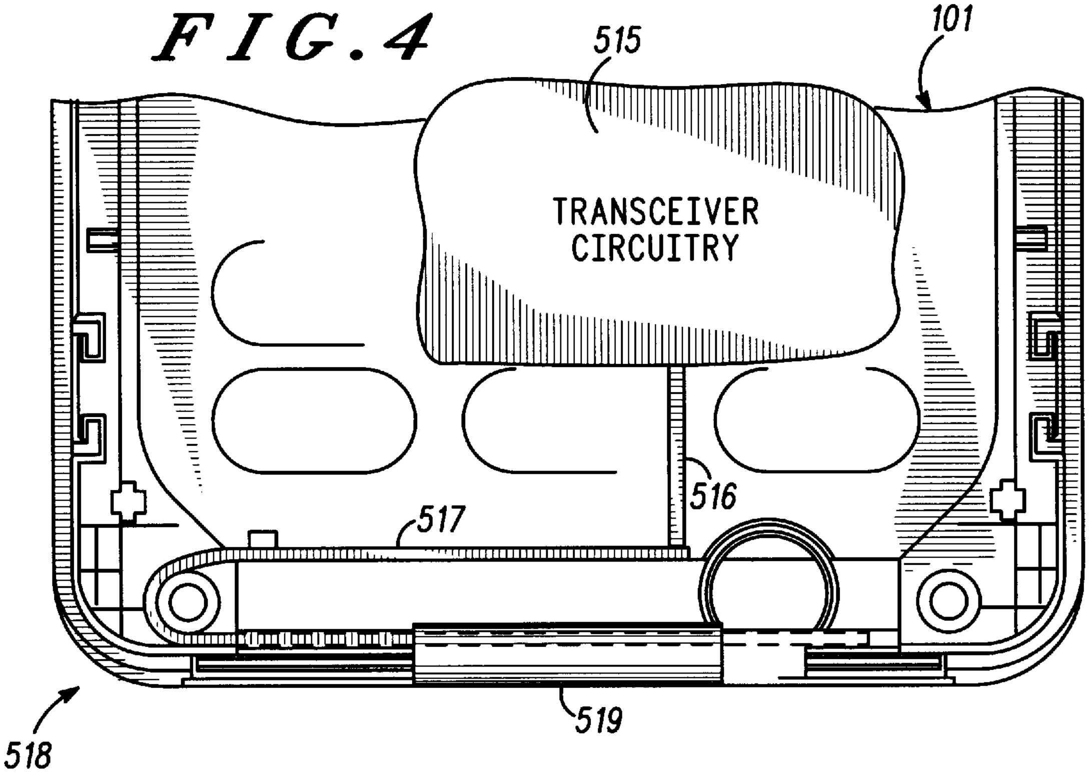
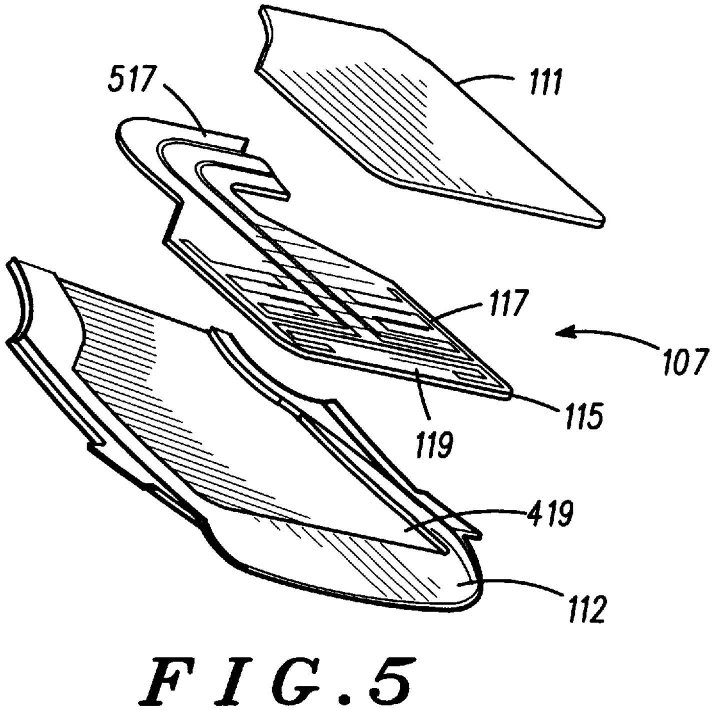
FIG. 5

MULTI-COMPONENT ANTENNA AND METHOD THEREFOR

This is a continuation of application Ser. No. 08/389,513, filed 16 Feb. 1995 and now abandoned, which is a continuation-in-part of application Ser. No. 08/306,784, filed Sep. 15, 1994 now abandoned.

FIELD OF THE INVENTION

The present invention pertains to antennas for communication apparatus.

BACKGROUND OF THE INVENTION

Radio communication devices include a transmitter and/or receiver coupled to an antenna which emits and/or detects radio frequency signals. The device may include a microphone for inputting audio signals to a transmitter or a speaker for outputting signals received by a receiver. Examples of such radio communication devices include one way radios, two way radios, radio telephones, personal communication devices, and a variety of other equipment. These communication devices typically have a standby configuration, wherein the device is collapsed for storage, and an active communication configuration, wherein the antenna is extended for optimum performance.

For radio telephones and two-way radios, it is typically desirable that these devices have a small size during a standby mode to facilitate storage and transport thereof. For example, users prefer that the radio telephones are small enough in the standby mode to permit storage in a shirt or jacket pocket. In the active communication state, it is desirable for the device to be sufficiently long to position the speaker adjacent to the user's ear, the microphone near the user's mouth, and the antenna away from the user's body. It is desirable for the antenna to be positioned away from the user's body since the user's body is a ground plane that interferes with radio frequency signal reception. One particularly effective way of positioning the antenna away from the user's body is to extend the antenna away from the device body during use. By providing an antenna which collapses for storage and extends for active communication, an antenna with optimum active mode operation is provided in a readily storable device.

A difficulty encountered with such reconfigurable communication devices is providing a high performance antenna in the standby mode. For example, radio telephones are known that receive paging signals, electronic mail, and call alerting signals in the standby mode. However, the body of the device, including the internal electronic circuitry within the body, is typically in the reactive near-field of the antenna in the storage position. This mass in the reactive near-field degrades performance of the antenna, which is detrimental to signal reception in the standby mode.

An example of a radio communication device including a multi-position antenna is a radio telephone including a body and keypad cover, wherein the keypad cover includes an antenna mounted thereon. When closed, the keypad cover covers the radio telephone keypad and provides a compact housing. When the keypad cover is opened, the keypad cover antenna is spaced from the telephone body which the user holds. Although the keypad cover antenna performs very well when the keypad cover is open, the proximity of the radio telephone body in the closed keypad cover position interferes with the operation of the antenna in the collapsed standby mode.

Accordingly, it is desirable to provide an antenna system having high performance characteristics when the communication device is extended in an active communication mode and when the communication device is collapsed in a standby mode of operation.

BRIEF DESCRIPTION OF THE DRAWINGS

FIG. 4 is a fragmentary view illustrating schematically the interior radio telephone according to FIG. 1 and a transceiver;

FIG. 5 is a fragmentary exploded view illustrating the keypad cover housing sections and the keypad cover antenna;

DETAILED DESCRIPTION OF THE PREFERRED EMBODIMENTS

A radio communication device includes radio frequency circuitry positioned in the first housing portion. A second housing portion is movably supported on the first housing portion to move between an extended position and a collapsed position, the second housing portion projecting outwardly from the first housing portion in the open position. An antenna is positioned in the second housing portion, the antenna includes a first component having a first tuning characteristic and a second component having a second tuning characteristic. The second antenna component is tuned for a preferred characteristic when the radio telephone is collapsed and the first antenna is tuned to the preferred characteristic when the antenna is extended.

The antenna system according to the invention is illustrated in a radio telephone 100 (FIG. 1) including a keypad cover, wherein the immediate invention is particularly advantageous. However, the invention may also be advantageously employed in other devices, such as one way and two way radios, personal communication devices, or any other radio communication equipment employing an antenna. Accordingly, "device" as used herein refers to all such devices and their equivalents.

Figure 1:
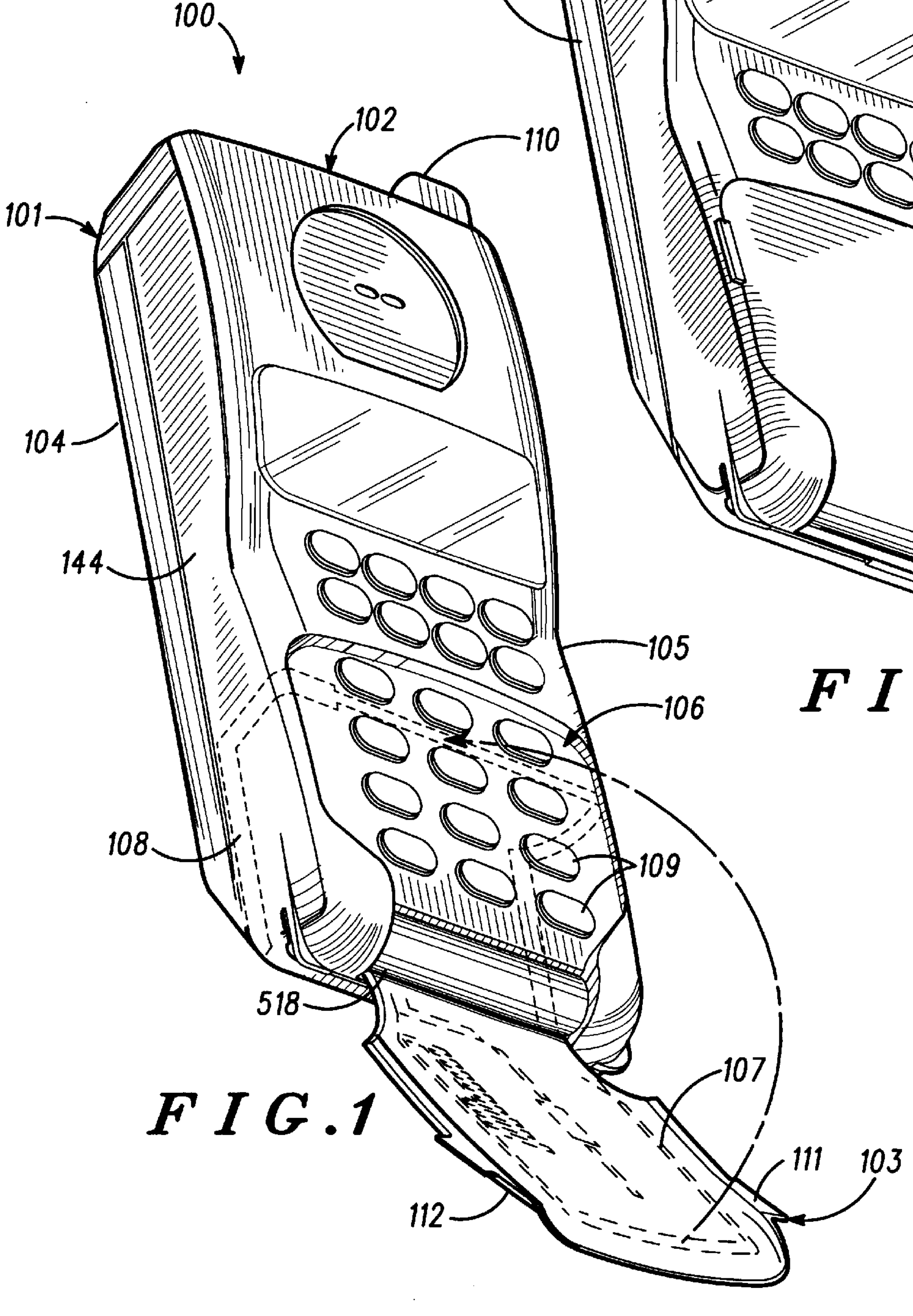
FIG. 1 is a front perspective view illustrating a radio telephone in an extended, or open position, housing configuration.

A radio telephone 100 is illustrated in FIG. 1. The radio telephone includes a housing 102. The housing 102 includes a first housing portion 101 and a second housing portion 103. In the illustrated embodiment, the first housing portion 101 is a radio telephone body and the second housing portion 103 is a keypad cover pivotably connected to the first housing portion. Second housing portion 103 moves by rotation between an extended configuration, illustrated in FIG. 1, during an active communication mode, and a collapsed, or closed, configuration, illustrated in FIG. 2, in a standby mode.

The first housing portion 101 includes a back body housing section 104 (FIG. 3) and a front body housing section 105 which are interconnected to define an interior volume housing electronic circuitry, including logic printed circuit board 314 and RF circuit board 315. A keypad 106 is positioned on front body housing section 105 such that keys 109 (only some of which are numbered) associated with the keypad are accessible for manual actuation by the user. The keys 109 are actuated manually to close popple switches 321 (only some of which are numbered).

The second housing portion 103 includes an antenna 107, referred to herein as a keypad cover antenna, which is a diversity antenna with mast antenna 110. The keypad cover antenna 107 is positioned between a front keypad cover housing section 111 (FIG. 5) and a back keypad cover housing section 112 (and thus is illustrated in phantom in FIG. 1). The front keypad cover housing section 111 and back keypad cover housing section 112 are generally planar members, which are manufactured of a suitable dielectric material, such as an organic polymer. The back keypad cover housing section 112 includes a recess 419 for receipt of keypad cover antenna 107 and front keypad cover housing section 111. The keypad cover antenna 107 is sandwiched between these keypad cover housing sections when the keypad cover is fully assembled. The keypad cover housing portion is assembled by connecting the front keypad cover housing section 111 to the back keypad cover housing section 112 using an adhesive or fastener.

Figure 2:
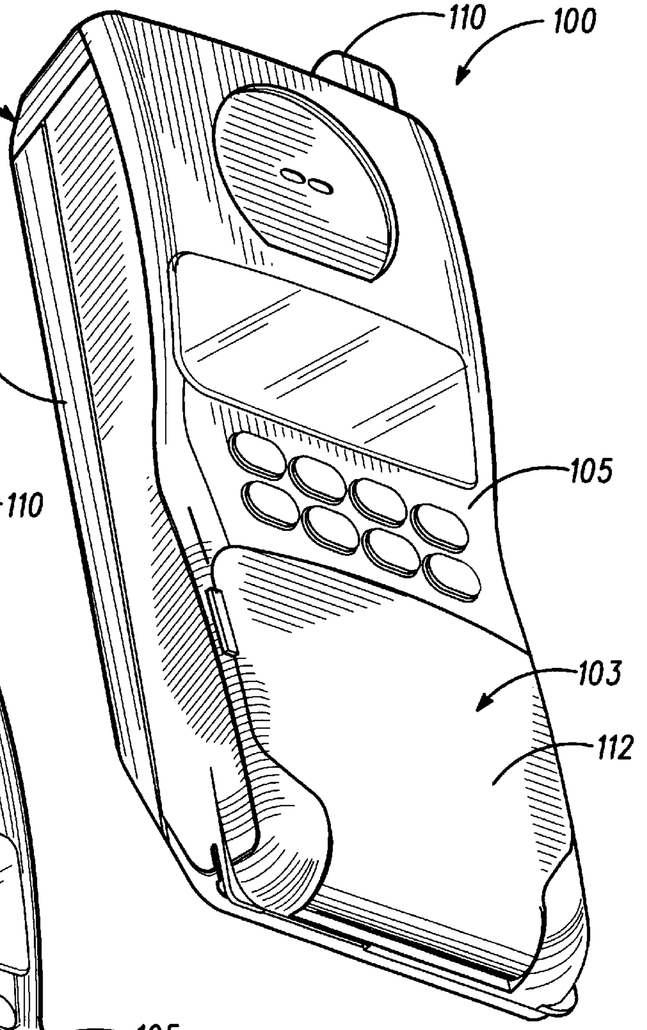
FIG. 2 is a front perspective view illustrating the radio telephone according to FIG. 1 in a collapsed, or closed position, housing configuration.

The keypad cover antenna 107 is in an extended position when the second housing portion 103 is open as illustrated in FIG. 1. The keypad cover antenna 107 is in a collapsed, or retracted, position when second housing portion 103 is closed (FIG. 2). The second housing portion 103 (FIG. 2) is a cover that at least partially covers keypad 106 when closed. The cover may be longer to cover all the keys. The second housing portion 103 prevents actuation of keys 109 covered thereby when the second housing portion is closed. Additionally, the second housing portion can place the radio telephone 100 in a standby mode when closed.

Figure 3:
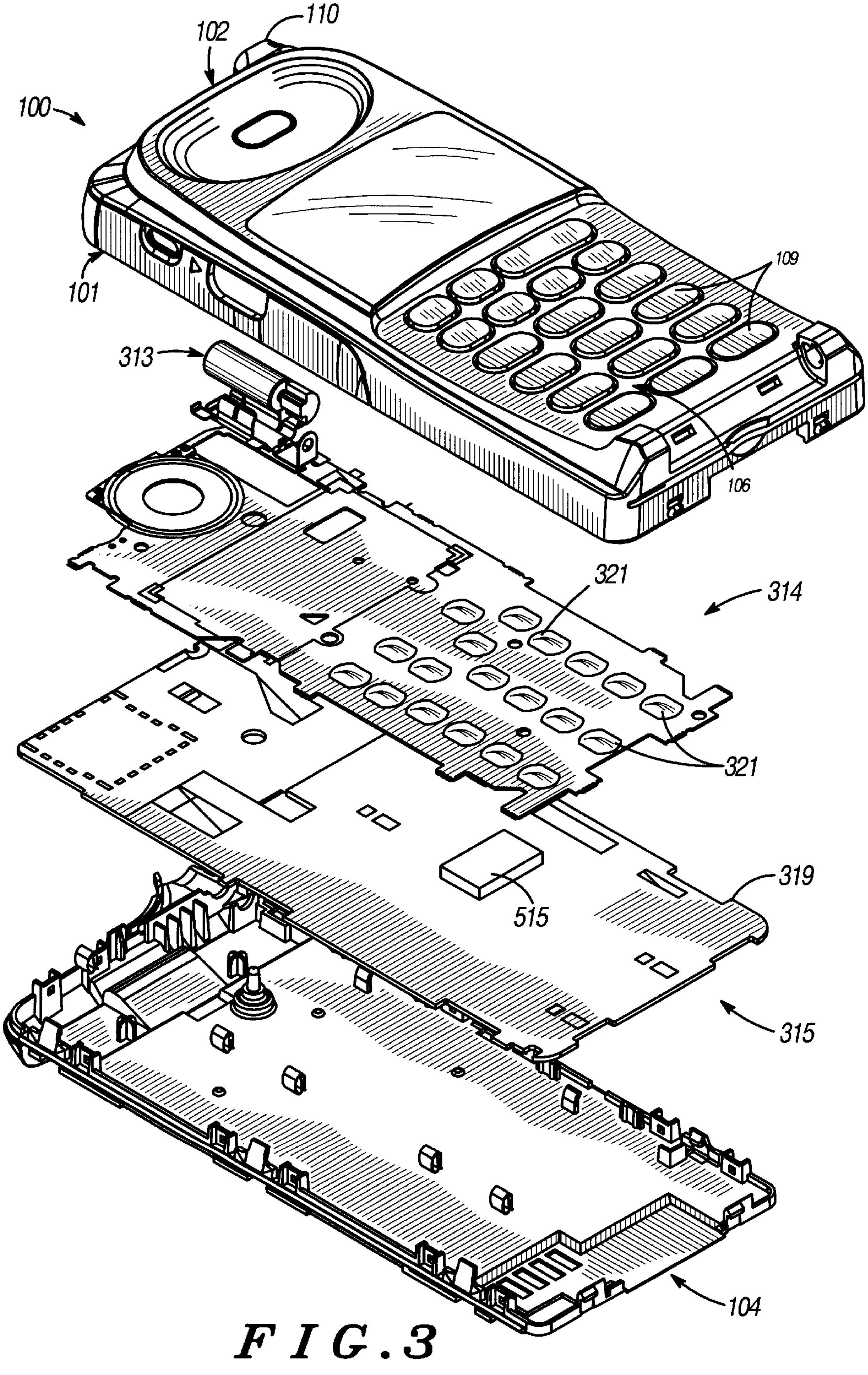
FIG. 3 is an exploded view illustrating the front housing, the radio frequency (RF) printed circuit board, logic printed circuit board, and rear housing of the radio telephone according to FIG. 1.

Transceiver circuitry 515 is generally represented in FIGS. 3 and 4. The transceiver circuitry 515 is supported on RF circuit board 315 (FIG. 3), and may be implemented using any suitable conventional transceiver. The transceiver circuitry 515 is assembled to RF circuit board 315 by conventional means. RF circuit board 315 and logic printed circuit board 314 are mounted between the front and back body housing sections 104 and 105 by any suitable means. The circuitry in radio telephone 100 includes a microphone (not shown) and receiver (not shown) positioned in first housing portion 101.

The transceiver circuitry 515 (FIG. 4) is connected to an elastomeric connector 516 which connects to a flex conductor, or transmission line, 517. The transmission line 517 extends into a hinge assembly 518, including a knuckle 519.

With reference to FIG. 1, the hinge assembly 518 provides the connection between the second housing portion 103 and the first housing portion 101. The hinge assembly may have any suitable construction, such as the hinge disclosed in U.S. patent application Ser. No. 08/148,718, filed on 8 Nov. 1993 in the name of Tanya Rush et al., the disclosure of which is incorporated herein by reference thereto.

Figure 7:
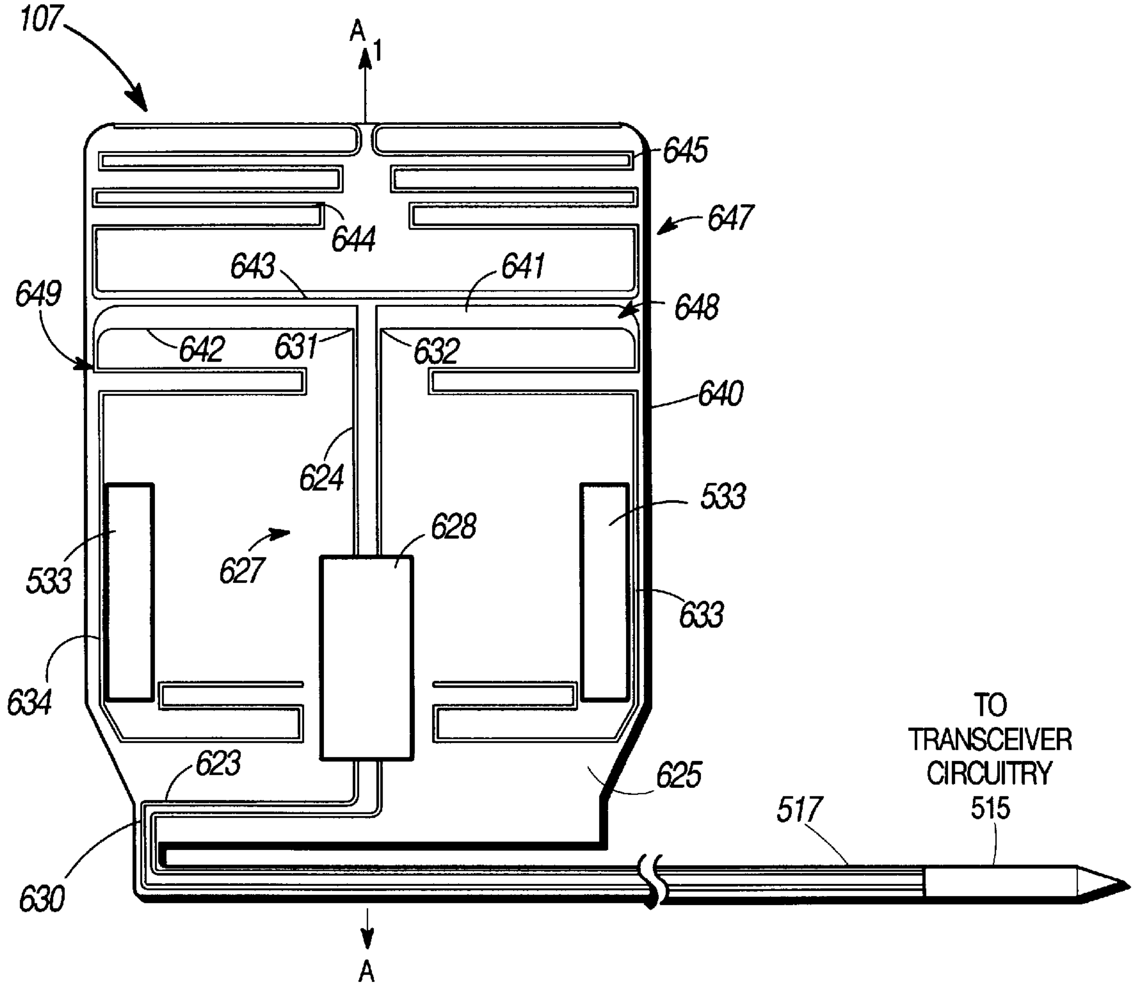
FIG. 7 is a top plan view illustrating a multi-component keypad cover antenna.

Keypad cover antenna 107 (FIG. 7) is connected to transmission line 517. The keypad cover antenna includes a first component 640 and a second component 647, both of which are embedded in dielectric body 625. The back of the dielectric body 625 has an adhesive (not shown) applied thereto. The adhesive is utilized to attach the dielectric body 625 to the back keypad cover housing section 112 (FIG. 5).

As used herein, a component is one or more conductors tuned to a particular frequency. The first component 640 includes dipole arms 648 and 649 which are tuned the same. The second component 647 includes section 643 which is tuned differently from dipole arms 648 and 649, such that it is a second component.

Dipole arms 648 (FIG. 7) and 649 are manufactured of two, respective, thin strips of a suitable conductor, such as copper, copper alloy, aluminum alloy, or the like, embedded in dielectric body 625. Dipole arms 648 and 649 are positioned on opposite sides of longitudinal center axis A1 of second housing portion 103. The transmission line 517 is connected to the dipole arms 648 and 649 via an impedance transformer 627. The impedance transformer includes first, second and third transformer sections 623, 628 and 624. First transformer section 623 is connected to transmission line 517 at junction 630. Third transformer section 624 is connected to dipole arm 649 at junction 631, and connected to dipole arm 648 at junction 632. Impedance transformer 627 provides impedance matching between dipole arms 648 and 649 and the transmission line 517. Dipole arm 648 includes a high current section 641 and a generally orthogonal extending folded section 633. Dipole arm 649 similarly includes a high current section 642 and a generally orthogonally extending folded section 634.

An opening 533 is cut out of each of the folded sections 633 and 634. Opening 533 is provided to receive respective magnets (not shown). The magnets actuate reed switches (not shown) in the first housing portion 101 to change the radio telephone 100 between a standby mode and an active communication mode. The read switches and magnets are not described in greater detail herein since they do not form a part of the immediate invention.

The keypad cover antenna 107 (FIG. 7) includes a second component 647, which includes a section 643 embedded in dielectric body 625. Section 643 is manufactured of a suitable thin electrical conductor such as copper, copper alloy, aluminum, an aluminum alloy, or the like. High current sections 641 and 642 of dipole arms 648 and 649 are tightly, inductively coupled to section 643 such that second component 647 is a passive antenna component. Tails 644 and 645 extend outwardly from opposite ends of section 643 in a serpentine pattern. Second component 647 is tuned to a different frequency than dipole arms 648 and 649.

Figure 6:
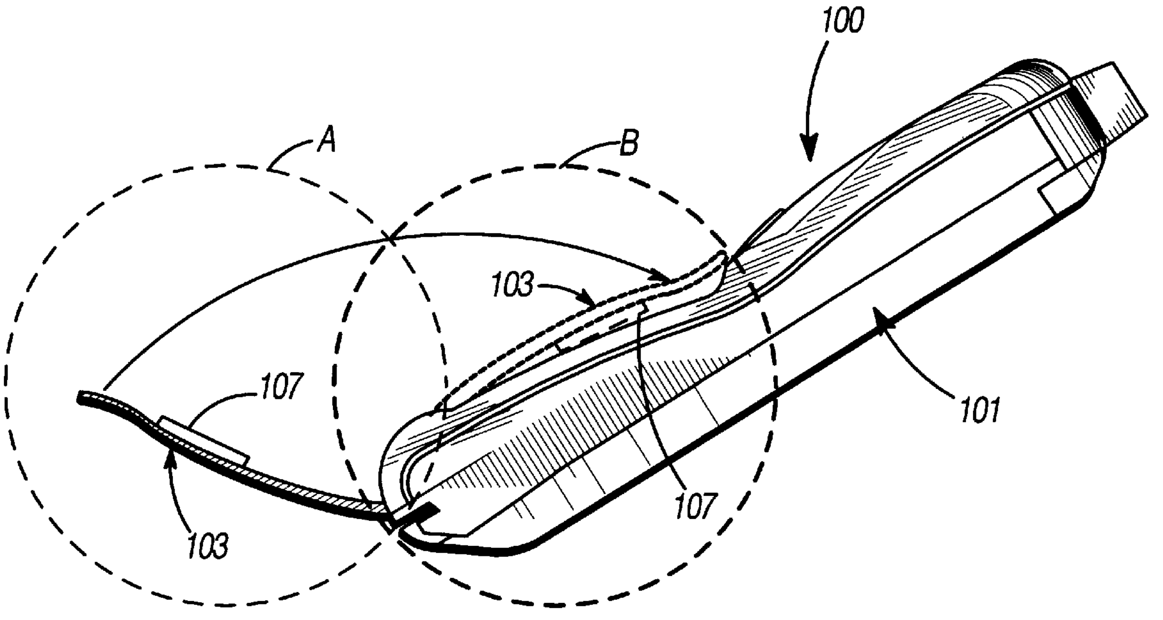
FIG. 6 is side elevational view of a radio telephone schematically illustrating the reactive near-field of the keypad cover antenna in the open and closed positions of the keypad cover.

The keypad cover antenna 107 has a reactive near-field volume A (FIG. 6) in the extended position and a reactive near-field volume B in the closed, or collapsed, position. Those skilled in the art will recognize that the dielectric constant of the near-field volume, or space, affects the performance of an antenna. Consequently, an antenna tuned to one frequency in a near-field volume having one dielectric constant will not be tuned in a near-field volume having another dielectric constant. The dielectric constant of the near-field volume in the open position approaches, or is approximately, 1, since it is predominantly air. The dielectric constant of the near-field space in the closed position is significantly different from that of air because of the substantial presence of first housing portion 101 and the circuitry therein. Consequently, an antenna properly tuned for the transceiver signal frequency in the open position of second housing portion 103 will not be properly tuned in the closed position of second housing portion 103, and consequently, performance is degraded in the closed position.

Figure 11:
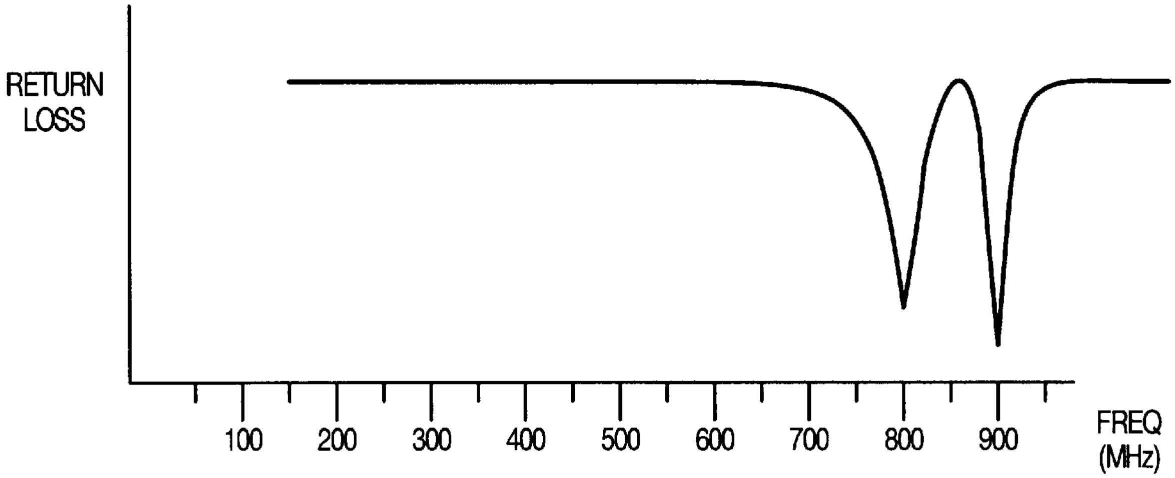
FIG. 11 illustrates return loss versus frequency for keypad cover antenna 107 when the keypad cover is extended.
Figure 12:
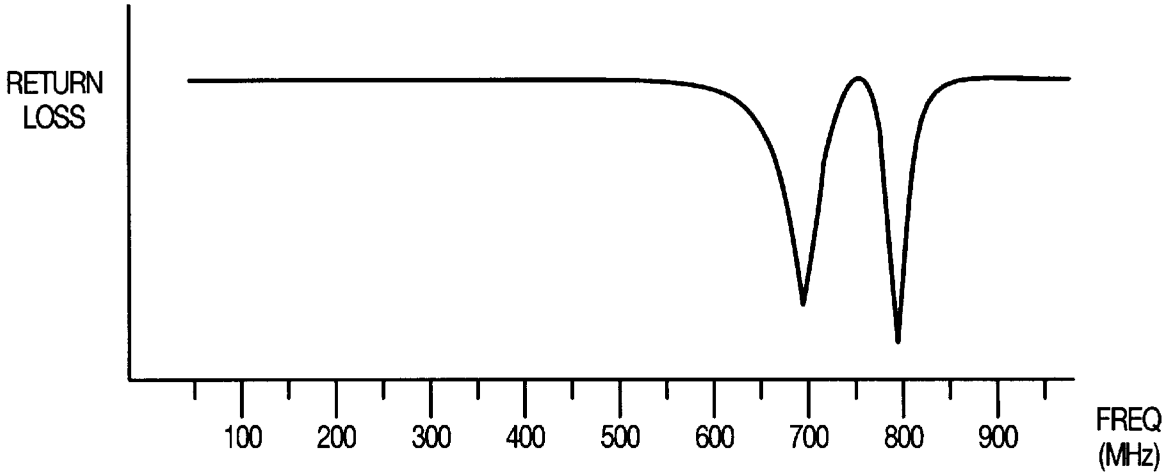
FIG. 12 illustrates return loss versus frequency for keypad cover antenna 107 when the keypad cover is collapsed as shown in FIG. 2.

Dipole arms 648 (FIG. 7) and 649 are tuned to the operating frequency (shown as 800 MHz in FIGS. 11 and 12) of the transceiver circuitry 515 when the keypad cover is open, and the predominance of the reactive near-field is air. This is represented by the return loss peak at 800 MHz in FIG. 11. The second component 647 return loss peak occurs at 900 MHz. The second component is tuned to the operating frequency of the transceiver circuitry 515, when the keypad cover is closed, and the first housing portion 101 of the radio telephone 100 is substantially positioned in the reactive near-field space of the keypad cover antenna 107. This is represented by the return loss peak at 800 MHz for second component 647 when the keypad cover is closed in FIG. 12. The return loss peak for first component 640 when the second housing portion 103 is closed is 700 MHz. The presence of the component which is not tuned to the operating frequency of the transceiver circuitry 515 does not affect performance of the transceiver since signals outside the operating frequency range are filtered by the transceiver. The use of two components tuned respectively for the closed and open positions insures that the antenna is tuned for a predetermined, preferred, characteristic, which is the operating frequency of the transceiver, when the second housing portion 103 is open (extended) and when the second housing portion is closed (collapsed).

Thus it can be seen that the keypad cover antenna 107 is a dipole antenna which is thin, being sandwiched between front keypad cover housing section 111 (FIG. 5) and back keypad cover housing section 112, to construct a thin keypad cover. The high current sections 641 (FIG. 7) and 642, of the dipole arms 648 and 649, are the high current sections of the keypad cover antenna. The performance of the antenna is enhanced by the positioning of the high current sections 641 and 642, of the dipole arms 648 and 649, remote from hinge assembly 518 in the extended position of FIG. 1. Additionally, in the illustrated embodiment, the antenna is a half-wavelength antenna, although it could be a quarter-wavelength, or any integer multiple thereof.

Figure 8:
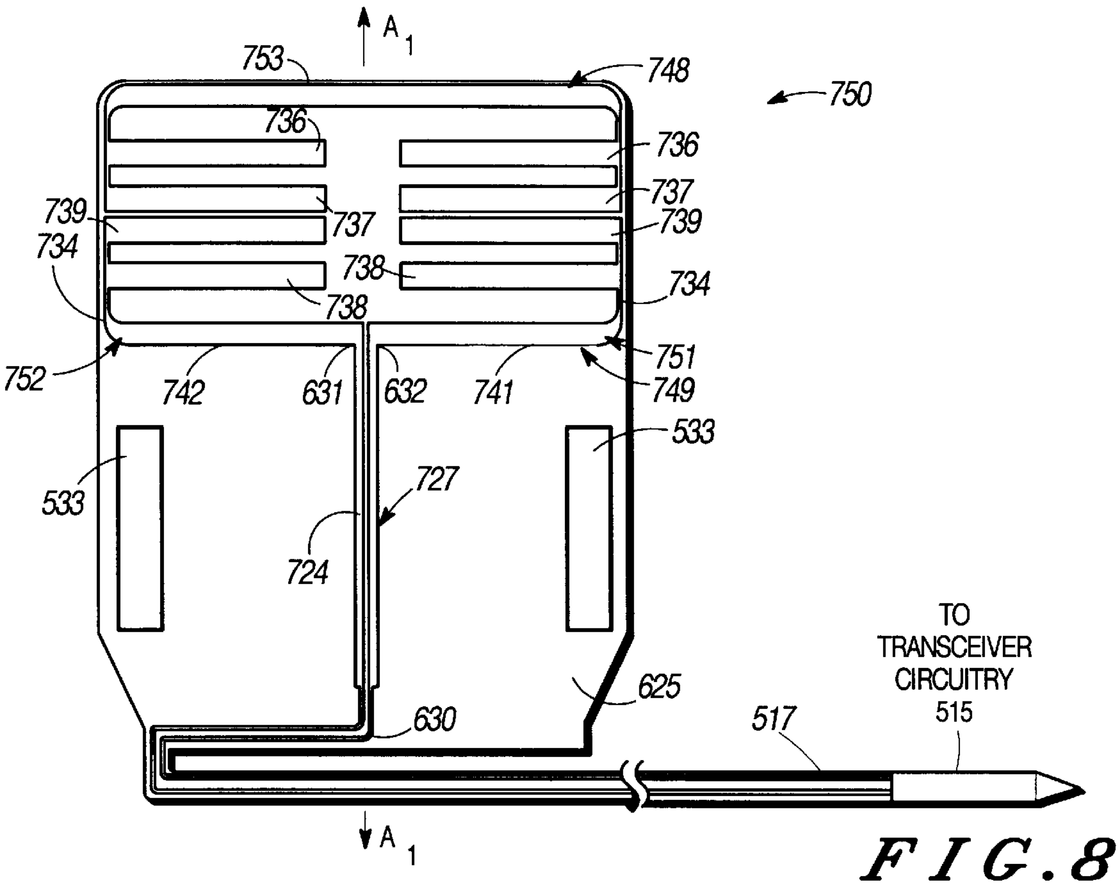
FIG. 8 is a top plan view illustrating an alternate embodiment of the multi-component keypad cover antenna.

Keypad cover antenna 750 according to an alternate embodiment is illustrated in FIG. 8. Impedance transformer 727 connects a first component 749 to transmission line 517. The transformer includes a single transformer section 724, which is an alternate for the three section transformer of FIG. 7. FIG. 8 illustrates a 1.5 GHz antenna.

Keypad cover antenna 750 includes a first component 749 including dipole arms 751 and 752 on opposite sides of center axis A1. Dipole arm 751 includes high current section 741 and folded section 733. Dipole arm 752 includes high current section 742 and folded section 734. Plates 738 and 739 extend from folded sections 733 and 734. The plates capacitively load the dipole arms to shorten the length of the dipole arms.

The keypad cover antenna also includes a second component 748 including plates 736 and 737 extending from a joinder section 753. Plates 737 and 736 are tightly, capacitively, coupled to plates 739 on dipole arms 751 and 752. The second component 748 is a passive antenna tuned to the operating frequency of the transceiver circuitry 515 when the second housing portion 103 is closed. Dipole arms 751 and 752 are tuned to the operating frequency of the transceiver when the first housing portion 101 is not in the reactive near-field of keypad cover antenna 750.

The antenna components are manufactured of a suitable thin, electrically conductive material, such as copper, copper alloy, aluminum, aluminum alloy, or the like, embedded in dielectric body 625. These dipole arms are tuned to the transceiver circuitry 515 for the open position of second housing portion 103, illustrated in FIG. 1. First component 749 is tuned to the transceiver circuitry 515 when the second housing portion is open and second component 748 is tuned to the transceiver circuitry 515 for the closed position of the second housing portion 103, illustrated in FIG. 2. Although the components are illustrated for use with a transceiver operating at 1.5 Ghz, those skilled in the art will recognize that antennas could be tuned to other frequencies by changing the length and/or shape thereof.

Figure 9:
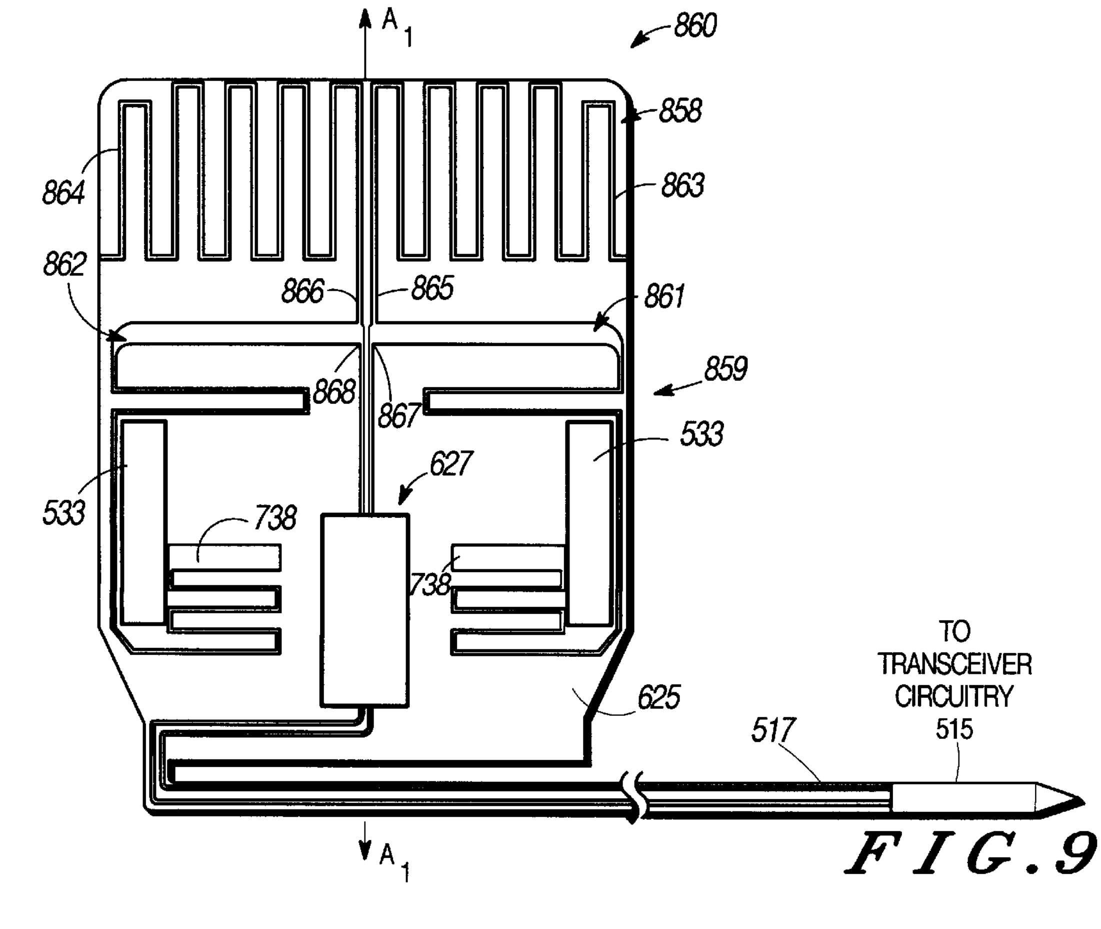
FIG. 9 is a top plan view illustrating an alternate embodiment of the multi-component keypad cover antenna.

Another keypad cover antenna 860 is illustrated in FIG. 9. Antenna 860 includes a first antenna component 859 and a second antenna component 858. First component 859 includes dipole arms 861 and 862, which are sections of the first component that are positioned on opposite sides of longitudinal axis A1. Second component 858 includes second component dipole arms 863 and 864 positioned on opposite sides of the longitudinal axis A1. Component dipole arms 861 and 862 are connected to second component dipole arms 863 and 864 by conductors 865 and 866.

The antenna components are manufactured of a suitable thin, electrically conductive material, such as copper, copper alloy, aluminum, aluminum alloy, or the like, embedded in dielectric body 625. First component 859 dipole arms 861 and 862 are tuned to the operating frequency of transceiver circuitry 515 when the second housing portion 103 is open, as illustrated in FIG. 1. Second component 858 dipole arms 863 and 864 are tuned to the operating frequency of transceiver circuitry 515 when the second housing portion 103 is illustrated in FIG. 2.

Figure 10:
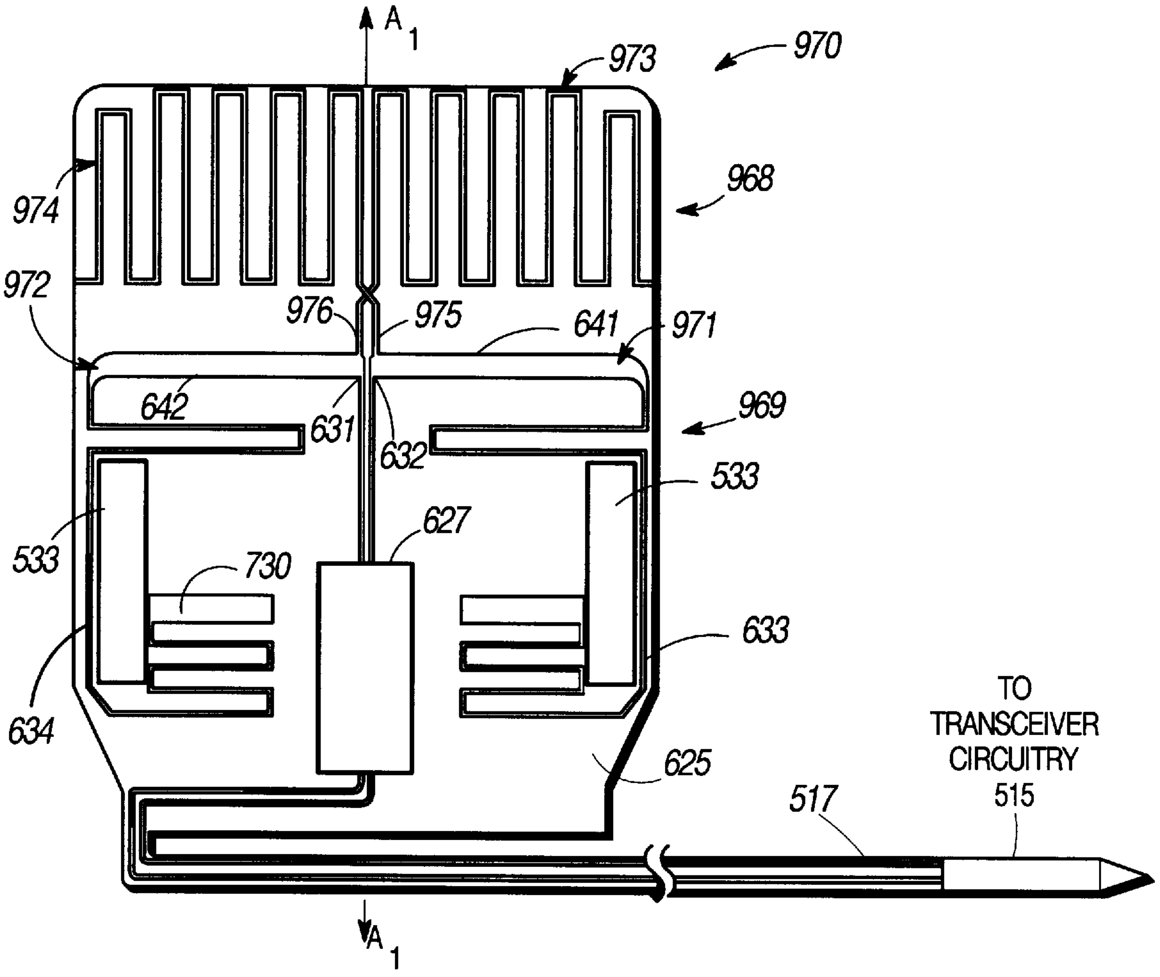
FIG. 10 is a top plan view illustrating an alternate embodiment of the multi-component keypad cover antenna.

Another keypad cover antenna 970 is illustrated in FIG. 10. Flip antenna 970 includes a first antenna component 969 and a second antenna component 968. The first antenna component comprises dipole arms 971 and 972, which are sections of the first component that are positioned on opposite sides of longitudinal axis A1. These arms are connected to transmission line 517 via impedance transformer 627. The second antenna component 968 includes component dipole arms 973 and 974 on opposite sides of longitudinal axis A1. Conductors 975 and 976 are connected to arms 974 and 973, respectively, and connect to dipole arms 971 and 972 at junction 632 and 631, respectively. Conductors 976 and 975 cross, but are not electrically connected.

The antenna components 969 and 968 are manufactured of a suitable thin, electrically conductive material, such as copper, copper alloy, aluminum, aluminum alloy, or the like, embedded in dielectric body 625. Dipole arms 971 and 972 are tuned to the operating frequency of the transceiver circuitry 515 when the second housing portion 103 is extended as illustrated in FIG. 1. Dipole arms 973 and 974 are tuned to the operating frequency of the transceiver circuitry 515 when the second housing portion is closed as illustrated in FIG. 2. By crossing conductors 975 and 976, the impedance of the system is altered relative to that of keypad cover antenna 860 in FIG. 9.

The connected components of keypad cover antennas 860 (FIG. 9) and 970 (FIG. 10) have the same effect as the inductively and capacitively coupled components of keypad cover antennas 107 (FIG. 7) and 750 (FIG. 8). Signals detected by the component which is not tuned to the operating frequency of transceiver circuitry 515 (FIG. 4) are attenuated by filtering in the transceiver. The antenna component tuned to the operating frequency will detect the desired signals. Accordingly, keypad cover antennas 860 and 970 operate as desired when the second housing portion 103 is extended or collapsed.

The components of keypad cover antennas 107 (FIG. 7) and 750 (FIG. 8) are preferably tightly coupled to maximize energy transfer from the second components 647 (FIG. 7) and 748 (FIG. 8) to the dipole arms 648 (FIG. 7) and 649 and 741 (FIG. 8) and 742, when the second housing portion 103 is closed. Additionally, those skilled in the art will recognize that either the crossed conductors 975, 976 (FIG. 10) of keypad cover antenna 970, or the uncrossed conductors 865, 866 (FIG. 9) of keypad cover antenna 860, will be selected to minimize interaction between the first and second antenna components.

Thus it can be seen that an antenna is disclosed for a movable housing portion which is tuned to the frequency of the transceiver circuitry in both an extended and a collapsed position. The antenna is thus tuned for optimum performance in both positions. By so tuning the antenna, the overall performance of a communication device incorporating the antenna is improved by the improvement in the antenna's performance.

We claim:

1. A radio communication device, comprising:

a first housing portion;

radio frequency circuitry positioned in the first housing portion, the radio frequency circuitry for communicating signals in a predetermined frequency range;

a second housing portion movably supported on the first housing portion to move between an extended position and a collapsed position, the second housing portion projecting outwardly from the first housing portion in the extended position; and an antenna positioned in the second housing portion in the open and closed positions, the antenna having first dipole arms having a first tuning characteristic and second dipole arms having a second tuning characteristic, the first and second tuning characteristics being different, wherein the second dipole arms are tuned for a preferred characteristic associated with the predetermined frequency range when the second housing portion is in the collapsed position and the first dipole arms are tuned to the preferred characteristic associated with the predetermined frequency range when the second housing portion is in the extended position.

2. The radio communication device as defined in claim 1, wherein the first and second dipole arms are mounted on the second housing portion.

3. The radio communication device as defined in claim 2, wherein the first dipole arms include at least one first plate and the second dipole arms include at least one second plate, and wherein the at least one first plate and the at least one second plate are capacitively coupled.

4. The radio communication device as defined in claim 1, wherein the second housing portion is a cover including front and back housing sections and the first and second dipole arms are positioned between the front and back housing sections.

5. A radio communication device, comprising:

a first housing portion;

radio frequency circuitry positioned in the first housing portion;

a second housing portion movably supported on the first housing portion to move between an extended position and a collapsed position, the second housing portion projecting outwardly from the first housing portion in the extended position; and an antenna positioned in the second housing portion, the antenna including a first component having a first tuning characteristic and a second component having a second tuning characteristic, wherein the second component is tuned for a preferred characteristic when the second housing portion is in the collapsed position and the first component is tuned to the preferred characteristic when the second housing portion is in the extended position;

wherein the second housing portion has a longitudinal axis, and the first component includes first and second sections positioned in the second housing portion and the second component includes first and second sections positioned in the second housing portion, wherein the first section of the first component and the first section of the second component are on one side of the longitudinal axis and the second section of the first component and the second section of the second component are on another side of the longitudinal axis.

6. The radio communication device as defined in claim 5, wherein the first section of the first component is coupled to the first section of the second component, and the second section of the first component is coupled to the second section of the second component.

7. The radio communication device as defined in claim 5 wherein the first section of the first component is connected to the second section of the second component and the second section of the first component is connected to the first section of the second component.

8. A radio telephone, comprising:

a first housing portion;

a transceiver positioned in the first housing portion to communicate signals within a predetermined frequency range;

a second housing portion movably supported on the first housing portion to move between an extended position and a collapsed position, the second housing portion projecting outwardly from the first housing portion in the extended position; and an antenna, the antenna positioned only in the second housing portion, the antenna coupled to the transceiver via a transmission line, the antenna including a first component having a first tuning characteristic and a second component having a second tuning characteristic, the first and second tuning characteristics being different, wherein the second component is tuned for a preferred characteristic when the near field has a first near field dielectric constant such that the second component is tuned to the predetermined frequency range when the second housing portion is in the collapsed position, and the first component is tuned to the preferred characteristic when the near field has a second dielectric constant such that the first component is tuned to the predetermined frequency range when the second housing portion is in the extended position;

wherein the first and second components each comprise dipole arms mounted on the second housing portion.

9. The radio telephone as defined in claim 8, wherein the first component includes at least one first plate and the second component includes at least one second plate, and wherein the at least one first plate and the at least one second plate are capacitively coupled.

10. The radio telephone as defined in claim 8 wherein the second housing portion has a longitudinal axis, and the first component includes first and second sections and the second component includes first and second sections, wherein the first section of the first component and the first section of the second component are on one side of the longitudinal axis and the second section of the first component and the second section of the second component are on another side of the longitudinal axis.

11. The radio telephone as defined in claim 10, wherein the first section of the first component is coupled to the first section of the second component, and the second section of the second component is coupled to the second section of the second component.

12. The radio telephone as defined in claim 10 wherein the first section of the first component is coupled to the second section of the second component and the second section of the first component is coupled to the first section of the second component.

13. The radio telephone as defined in claim 8, wherein the second housing portion is a cover including front and back housing sections and wherein the antenna is sandwiched between the front and back housing sections.

14. The radio telephone as defined in claim 13, wherein the first housing portion includes a keypad, and the cover covers at least a portion of the keypad in the collapsed position.

15. A method of providing an antenna for a radio telephone, including transceiver circuitry operating at a signaling frequency and positioned in a first housing portion, and a second housing portion movably supported on the first housing portion, comprising the steps of:

providing a first dipole antenna component in the second housing portion tuned to the signaling frequency of the transceiver circuitry when the near field dielectric constant has a first value such that the antenna is tuned to the signaling frequency when the housing portion is in an open housing configuration; and providing a second dipole antenna component in the second housing portion, the second antenna component coupled to the first antenna component, the second antenna component tuned to the signaling frequency of the transceiver circuitry when the near field dielectric constant has a second value, the first and second values being different, such that the antenna is tuned to the signaling frequency when the housing portion is in a closed housing configuration.

16. The method as defined in claim 15, further comprising the step of providing a hinge between the first and second housing portions.

* * * * *